(12) United States Patent
Garg et al.

(10) Patent No.: US 9,819,541 B2
(45) Date of Patent: Nov. 14, 2017

(54) PTP OVER IP IN A NETWORK TOPOLOGY WITH CLOCK REDUNDANCY FOR BETTER PTP ACCURACY AND STABILITY

(71) Applicant: Cisco Technology, Inc., San Jose, CA (US)

(72) Inventors: Vineet Kumar Garg, Bangalore (IN); Naga Venkata Hari Krishna Nandipati, Andhra Pradesh (IN)

(73) Assignee: Cisco Technology, Inc., San Jose, CA (US)

( * ) Notice: Subject to any disclaimer, the term of this patent is extended or adjusted under 35 U.S.C. 154(b) by 321 days.

(21) Appl. No.: 14/749,175

(22) Filed: Jun. 24, 2015

(65) Prior Publication Data

US 2016/0277138 A1 Sep. 22, 2016

(30) Foreign Application Priority Data

Mar. 20, 2015 (IN) .......................... 1386/CHE/2015

(51) Int. Cl.
*H04L 12/24* (2006.01)
*H04L 12/733* (2013.01)
*H04J 3/06* (2006.01)

(52) U.S. Cl.
CPC ........ *H04L 41/0816* (2013.01); *H04J 3/0641* (2013.01); *H04J 3/0667* (2013.01); *H04L 41/0668* (2013.01); *H04L 45/20* (2013.01)

(58) Field of Classification Search
CPC . H04L 41/0816; H04L 41/0668; H04L 45/20; H04J 3/0641; H04J 3/0667
See application file for complete search history.

(56) References Cited

U.S. PATENT DOCUMENTS

| 2002/0193945 A1* | 12/2002 | Tan ..................... H04W 56/001 701/469 |
| 2010/0153742 A1* | 6/2010 | Kuo ....................... H04L 63/04 713/189 |
| 2015/0127978 A1* | 5/2015 | Cui ........................ H04L 69/28 714/15 |
| 2015/0318941 A1* | 11/2015 | Zheng .................. H04J 3/0697 370/503 |

* cited by examiner

*Primary Examiner* — Chi H Pham
*Assistant Examiner* — Weibin Huang
(74) *Attorney, Agent, or Firm* — Patterson + Sheridan, LLP

(57) ABSTRACT

In one embodiment, a technique for implementing precision time protocol (PTP) over a packet transport (e.g., IPv4, IPv6, etc.) with clock redundancy is provided. The technique may involve maintaining clock synchronization by a PTP node, where the PTP node participates in an exchange of one or more messages with a current master node and at least one connected node that is a slave to the PTP node. The technique may also involve detecting one or more conditions that prompt a switch to a new master PTP node. The technique may further involve selecting the new master PTP node, and determining, based on the selection, whether the new master PTP node is a slave to the PTP node. The technique may yet further involve taking action, based on the determination, to indicate to the new master PTP node that the PTP node is not a suitable master.

20 Claims, 11 Drawing Sheets

PTP OVER IP IN A NETWORK TOPOLOGY WITH CLOCK REDUNDANCY FOR BETTER PTP ACCURACY AND STABILITY

CROSS-REFERENCE TO RELATED APPLICATIONS

The present application for patent claims priority to Indian Provisional Patent Application No. 1386/CHE/2015, entitled "PTP OVER IP IN A RING TOPOLOGY WITH CLOCK REDUNDANCY FOR BETTER PTP ACCURACY AND STABILITY," filed Mar. 20, 2015, which is assigned to the assignee of the present application and hereby expressly incorporated by reference herein in its entirety.

TECHNICAL FIELD

Embodiments presented in this disclosure generally relate to timing synchronization, and more specifically, embodiments disclosed herein relate to techniques and apparatuses for maintaining timing synchronization and/or phase accuracy among a plurality of nodes in a network.

BACKGROUND

Networks with applications that, in general, rely on high levels of precision to implement one or more functions typically use synchronization protocols such as network timing protocol (NTP) or precision timing protocol (PTP) in order to provide time synchronization for the elements (nodes) within the network. NTP and PTP are both packet-based synchronization methods that transfer time and frequency references using packets containing time-stamps between elements in the network. The time-stamps, in general, are associated with the time-of-arrival and time-of-departure of the packets, which the network elements use to perform synchronization.

The key difference between NTP and PTP is the level(s) of precision obtainable between the two protocols. For example, NTP is generally used for general timing applications and is capable of providing timing synchronization on the order of (several) milliseconds. PTP (as specified in IEEE-1588v2), on the other hand, is generally used for applications that require high levels of precision (e.g., such as industrial automation networks, testing and measurement networks, telecommunications networks, etc.) and is capable of providing timing synchronization on the order of nanoseconds.

A typical PTP deployment generally involves the use of a PTP master, PTP slave, PTP boundary clock (BC) and/or PTP grandmaster to provide timing synchronization. The PTP master provides the reference point (e.g., in the form of time-stamps) that one or more PTP slaves connected to the PTP master utilize in order to perform synchronization. A PTP master that is synchronized to a primary reference clock (PRC) (such as an atomic clock, GPS, etc.) is referred to generally as a PTP grandmaster and is typically used as the root timing reference. A PTP BC, in general, is a device that has both slave and master functions and may be used to transfer time in a relay fashion. For example, the BC may act as a slave clock to a master clock and also as a master clock to one or more slaves in the network.

BRIEF DESCRIPTION OF THE DRAWINGS

So that the manner in which the features of the present disclosure can be understood in detail, a more particular description of the disclosure, briefly summarized below, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
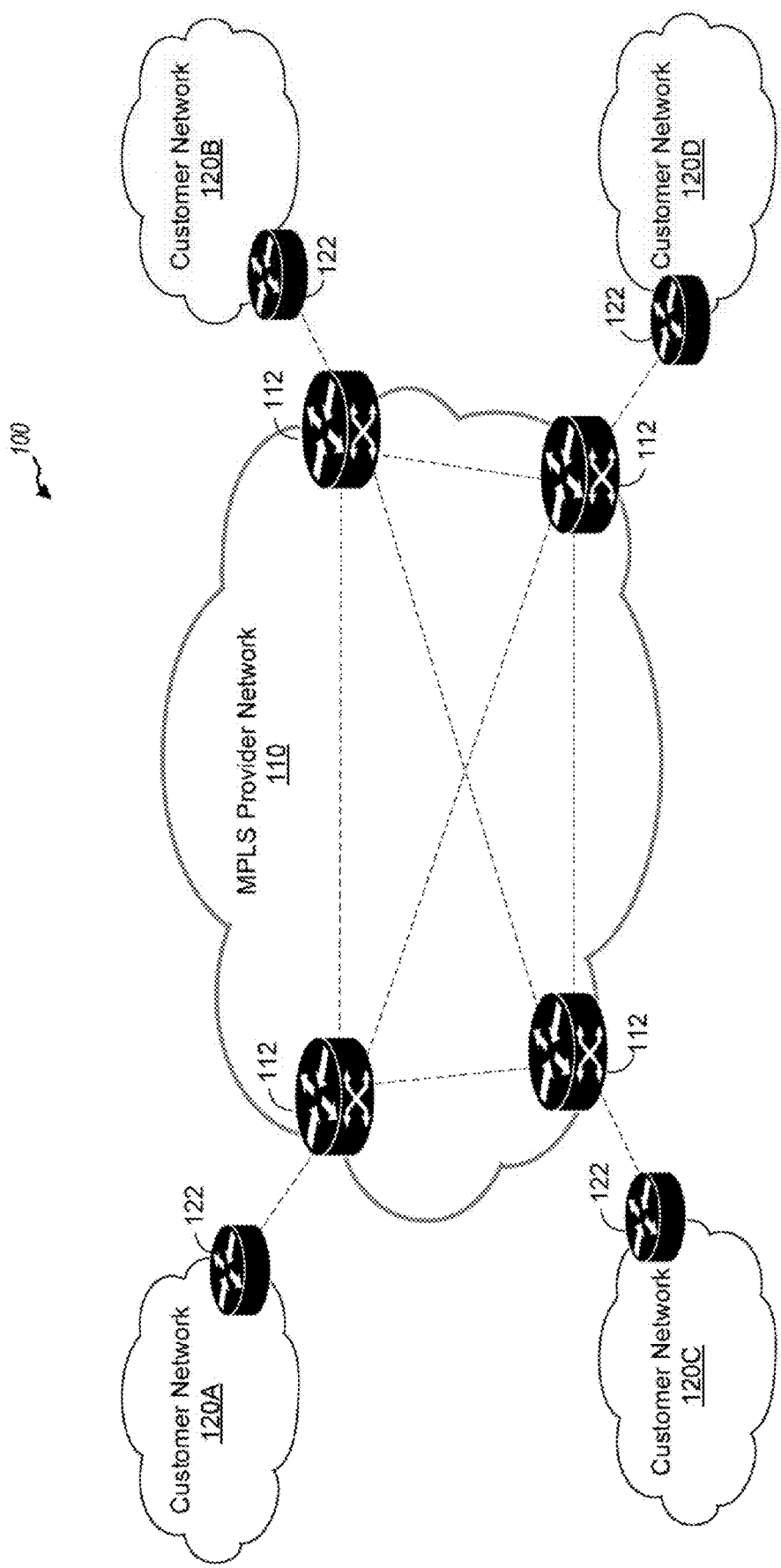
FIG. 1 illustrates an example network topology in accordance with embodiments of the present disclosure.

One example embodiment provides a method for maintaining clock synchronization by a precision time protocol (PTP) node. The method generally includes the PTP node participating in an exchange of one or more messages associated with a PTP over a packet transport (e.g., such as IPv4, IPv6, multi-protocol label switching (MPLS), etc.). For example, the PTP node may perform clock synchronization based on a timestamp received from a current master PTP node and also serve as a master node to at least one connected PTP node that performs clock synchronization based on a timestamp received from the PTP node. The method may also include the PTP node detecting one or more conditions between the PTP node and the current master PTP node that prompt a switch, based on an alternate best master control algorithm (BMCA), to a new master PTP node. The method may also include selecting the new master PTP node, based on the alternate BMCA, and determining, based on the selection, whether the new master PTP node is a slave to the PTP node. The method may further include taking action, based on the determination, to indicate to the new master PTP node that the PTP node is not a suitable master.

Another example embodiment provides a network device that is configured to implement PTP. The network device generally includes a processor configured to participate, via a plurality of ports, in an exchange of one or more messages associated with a PTP over a packet transport. For example, the processor may synchronize a local clock based on a timestamp received, via a first port of the plurality of ports, from a current master PTP network device, and transmit, via a second port of the plurality of ports, a timestamp to at least one connected PTP network device that performs clock synchronization based on the transmitted timestamp. The processor may also be configured to detect one or more conditions between the network device and the current master PTP network device that prompt a switch, based on an alternate BMCA, to a new master PTP network device, select the new master PTP network device, based on the alternate BMCA, and determine, based on the selection, whether the new master PTP network device is a slave to the network device. The processor may further be able to take action, based on the determination, to indicate to the new master PTP network device that the network device is not a suitable master. The network device also generally includes a memory coupled to the processor.

Still another embodiment provides a non-transitory computer-readable medium containing computer program code that, when executed, performs an operation. The operation includes participating, by a PTP node, in an exchange of one or more messages associated with a PTP over a packet transport. For example, the PTP node may perform clock synchronization based on a timestamp received from a current master PTP node and also serves as a master node to at least one connected PTP node that performs clock synchronization based on a timestamp received from the PTP node. Additionally, the operation includes detecting one or more conditions between the PTP node and the current master PTP node that prompt a switch, based on an alternate best master control algorithm (BMCA), to a new master PTP node, selecting the new master PTP node, based on the alternate BMCA, and determining, based on the selection, whether the new master PTP node is a slave to the PTP node. The operation may further include taking action, based on the determination, to indicate to the new master PTP node that the PTP node is not a suitable master.

Example Embodiments

In general, timing synchronization protocols (such as NTP and PTP) may be subject to packet delay variation (PDV) and/or asymmetry, which may lead to synchronization error during the synchronization process. PDV, in general, may refer to the variability of delay that packets may experience due to queuing, geographical distance between network elements, traffic conditions, and/or other similar factors. In some cases, PDV may also lead to asymmetry between the network elements.

Asymmetry, in general, may refer to the difference in transit delay of designated packets in the two directions (e.g., transmit and receive paths) between two network elements. This difference may be caused by differences in queuing and/or congestion between transmit and receive paths, alternate paths for transmit and receive directions, rate-adaptation in the network elements, and/or other similar factors. Since, PTP may assume that the two communication paths between a master and slave is symmetric, any asymmetry that is encountered may affect the accuracy of the synchronization process.

Synchronization protocols such as PTP may be implemented over various packet transports, for example, such as internet protocol (IP) version 4 (IPv4), IPv6, multi-protocol label switching (MPLS), etc. However, due in part, to PDV and/or asymmetry, there may be several challenges with implementing PTP over a packet transport.

As such, embodiments disclosed herein provide improved techniques for implementing PTP over a packet transport.

FIG. 1 illustrates an example of a network architecture 100 in which aspects of the present disclosure may be practiced. For example, according to some embodiments, as will be described in more detail below, techniques presented herein may allow for the implementation of a synchronization protocol (e.g., PTP, etc.) by the one or more nodes within the network architecture 100.

The network 100 generally includes a provider network 110 that routes network traffic (e.g., of data, voice, and the like) between various customer networks 120A-D. As illustrated, the customer networks 120A-D may connect to the provider network 110 via customer edge (CE) routers 122 connected to provider edge (PE) routers 112 that are part of the provider network 110. While not shown, those of ordinary skill in the art will appreciate that the provider network 110 may also include a "fabric" of intermediate network devices, such as switches and routers that route and support traffic between the PE routers 112.

According to some embodiments, the provider network 110 may be a network that supports a packet transport protocol. In one embodiment, the packet transport may be a version of IP (e.g., IPv4, IPv6, etc.). In another embodiment, the packet transport protocol may be MPLS. For example, as shown, in this embodiment, the provider network 110 may be a MPLS network that forwards IP traffic using labels. As used herein, such a network may be referred to as an IP/MPLS network. These labels may instruct the routers and the switches in the provider network 110 where to forward packets as they are routed between PE routers 112 en route to CEs 122 at the customer sites 120A-D based on pre-established IP routing information. The IP/MPLS network 110 may be able to utilize various IP protocols (e.g., IPv4, IPv6) in order to forward IP traffic.

For the sake of convenience, as used herein, "PTP over IP" may, in general, refer to the implementation of PTP over various packet transports, such as IPv4, IPv6, MPLS, etc.

Figure 2:
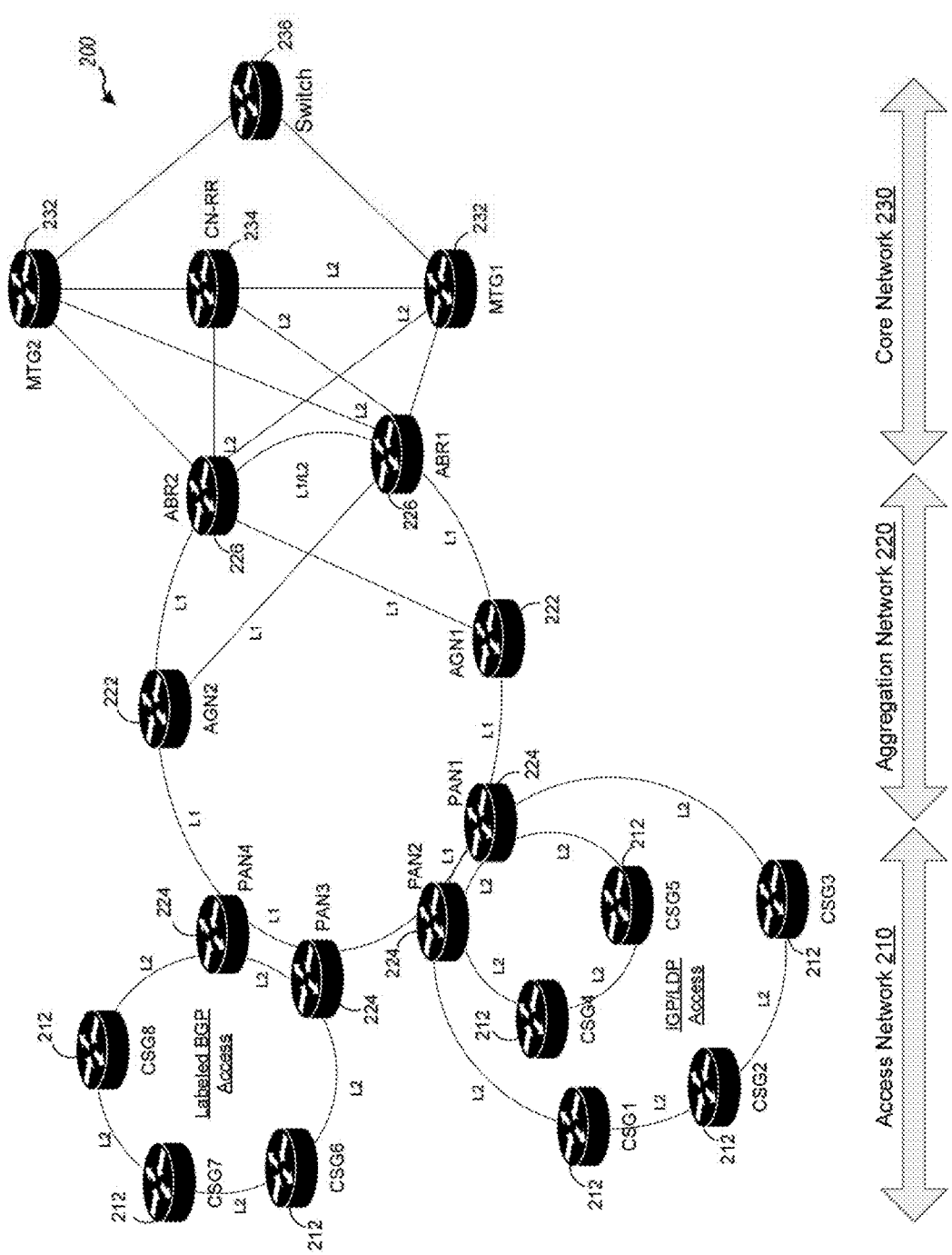
FIG. 2 illustrates another example network topology in accordance with embodiments of the present disclosure.

FIG. 2 illustrates an example network architecture 200 in accordance with another embodiment of the present disclosure, in which aspects of the present disclosure may be practiced. For example, the techniques presented herein may allow for the implementation of synchronization protocol (e.g., PTP, etc.) by the one or more nodes within the network architecture 200.

The network 200 generally includes an access network 210, aggregation network 220, and a core network 230, each of which may support one or more layer 1 (L1) or layer 2 (L2) protocols. Each of these networks may include a plurality of intermediate network devices (e.g., switches, routers, etc.) that may be used for forwarding and routing traffic in and/or between the networks. For example, as shown, the access network 210 may include one or more cell site gateways (CSGs) 212 (e.g., CSG1-8) deployed in a ring topology. The access network 210 may implement one or more protocols for the exchange of label mapping information and/or routing information between the different nodes of the access network 210 and between other networks (e.g., aggregation network 220, etc.). For example, as shown, the one or more protocols may include label distribution protocol (LDP), and one or more gateway protocols, such as interior gateway protocol (IGP) and labeled border gateway protocol (BGP). LDP, in general, may be used for the exchange of label mapping information (between the CSGs 212) associated with MPLS. IGP, in general, may be used for the exchange of routing information between the CSGs 212. Some examples of IGP protocols include Open Shortest Path First (OSPF), Routing Information Protocol (RIP) and Intermediate System to Intermediate System (IS-IS). BGP may also be used for exchanging routing information, but is generally used for routing information between different networks (e.g., such as between access network 210 and aggregation network 220, as shown).

The aggregation network 220 may include one or more aggregation nodes (AGNs) 222 (e.g., AGN1-2) deployed in a ring topology. The aggregation network 920 may also include one or more pre-aggregation nodes (PANs) 224 (e.g., PAN1-4) and area border routers (ABRs) 226 (e.g., ABR1-2), which may be used as interconnection nodes between the access network 210 and core network 230, respectively. Further, as shown, the core network 230 may include one or more mobile transport gateways (MTGs) 232 (e.g., MTG1-2), core network route reflectors (CN-RRs) 234, area border routers (ABRs) 226, switch 236, etc. Although not shown, those of ordinary skill in the art will understand that the network 200 may also include other nodes and also interconnect with other access networks and aggregation networks. Further, although FIG. 2 shows the various nodes within access network 210 and aggregation network 222 configured in a ring topology, those of ordinary skill in the art will appreciate that the nodes within these networks may also be configured in non-ring topologies (e.g., such as a chain (linear) topology, etc.).

According to some embodiments, the network 200 may be an end-to-end packet transport network (i.e., support a packet transport protocol within the access, aggregation and core networks). For example, in one embodiment, the packet transport protocol may be MPLS and the network 200 may be referred to as a unified MPLS architecture 200. However, in other embodiments, the network 200 may support other transport protocols.

Figure 3:
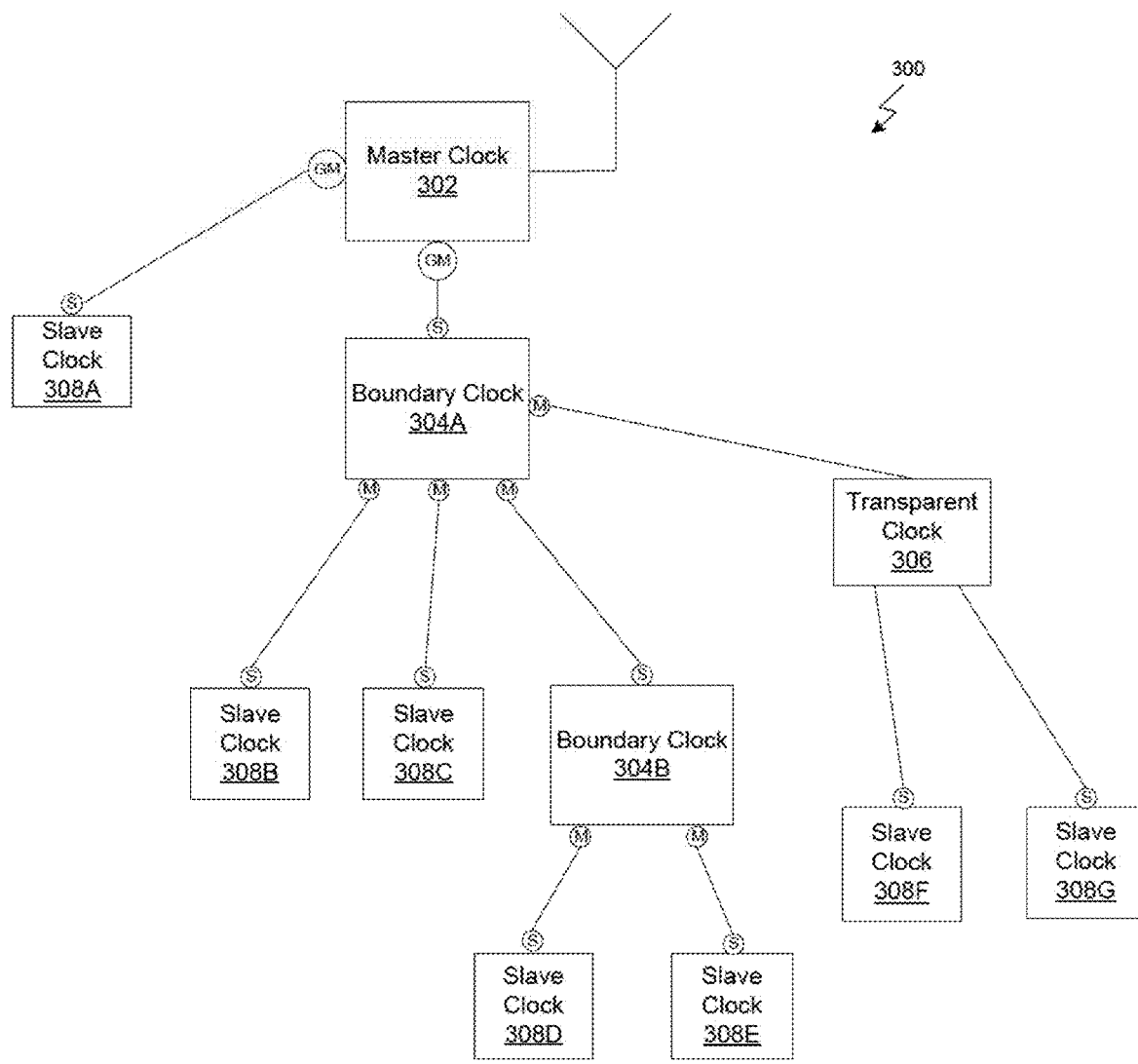
FIG. 3 illustrates an example PTP deployment for a network in accordance with embodiments of the present disclosure.

As mentioned above, in some cases, synchronization protocols such as PTP may be implemented over the nodes within a packet transport network, such as that illustrated in FIGS. 1-2. FIG. 3 illustrates an example deployment scenario 300 for PTP that may be utilized within a packet transport (e.g., such as IP/MPLS network 110 shown in FIG. 1, network 200 shown in FIG. 2, etc.), according to one embodiment of the present disclosure.

In this particular embodiment, the PTP deployment scenario may involve one or more different types of nodes such as a master clock 302, boundary clocks (BCs) 304A-B, transparent clock (TC) 306, and slave clocks 308A-G. As noted above, the master clock 302 may provide the reference point (e.g., in the form of time-stamps) that one or more slave clocks (e.g., slave 308A, BC 304A, etc.) connected to the master clock 302 utilize in order to perform synchronization. Although not shown, the master clock 302 may also be a grandmaster clock. A grandmaster clock, in general, may refer to a master clock that is synchronized to a primary reference clock (PRC) such as an atomic clock, GPS, etc., that provides a root timing source.

As mentioned above, the PTP deployment scenario, in some cases, may be subject to PDV and/or asymmetry that is created, in part, due to routing of packets throughout the IP/MPLS network. To address these effects, the PTP deployment scenario may utilize BCs 304 and TC(s) 306 to mitigate the effects of PDV and/or asymmetry.

The BCs 304 are devices that, in general, have both slave and master functions and may be used to transfer time in a relay fashion. BCs 304, in general, may address the problem of PDV and/or asymmetry by having the capability to synchronize to a master clock and act as a master clock to one or more slave clocks. For example, each one of the BCs 304 may have one port that is in a slave state (e.g., slave port) and one or more other ports that are in a master state (e.g., master port(s)). As shown, the slave port of BC 304A, for example, may synchronize to timestamps received from the master port (or grandmaster port for a grandmaster clock) of master clock 302, while the master ports of BC 304A may provide timestamps to the slave ports of slaves 308B, 308C and BC 304B. Similarly, as also shown, while serving as a slave to BC 304A, the master ports of BC 304B may provide timestamps to the slave ports of slave clocks 308D and 308E.

On the other hand, TC(s) 306 is a device that, in general, has neither slave nor master ports, but rather may be capable of accounting for packet delay by modifying a time-interval correction field of a packet (that may have a timestamp) received from a master node. For example, in the embodiment shown in FIG. 3, TC 306 may receive timestamps (in a PTP packet) from BC 304A, measure the amount of time that the packet is stored in TC 306, modify a time-interval correction field of the packet based on the stored amount of time, and transmit the packet to one or more slave clocks 308F and 308G.

In some embodiments, although not shown, the functionality of the various PTP nodes (e.g., master clock, slave clock, BC, TC, etc.) in the PTP deployment scenario may be implemented in a switch/router of a network (e.g., such as the routers/switches of the networks in FIGS. 1-2). Each one of these nodes may have a local clock that is synchronized according to the techniques presented herein. Further, although the illustrated example embodiment depicts a particular number of each type of PTP node, those of ordinary skill in the art will appreciate that the PTP deployment may include any number of the different types of PTP nodes.

According to some embodiments, the PTP nodes in the PTP scenario may be configured in various different network topologies, such as for example, ring topologies, linear topologies, mesh topologies, hybrid topologies, etc. However, for the sake of clarity, the nodes within the various embodiments disclosed herein are shown configured in ring topologies.

Figure 4A:
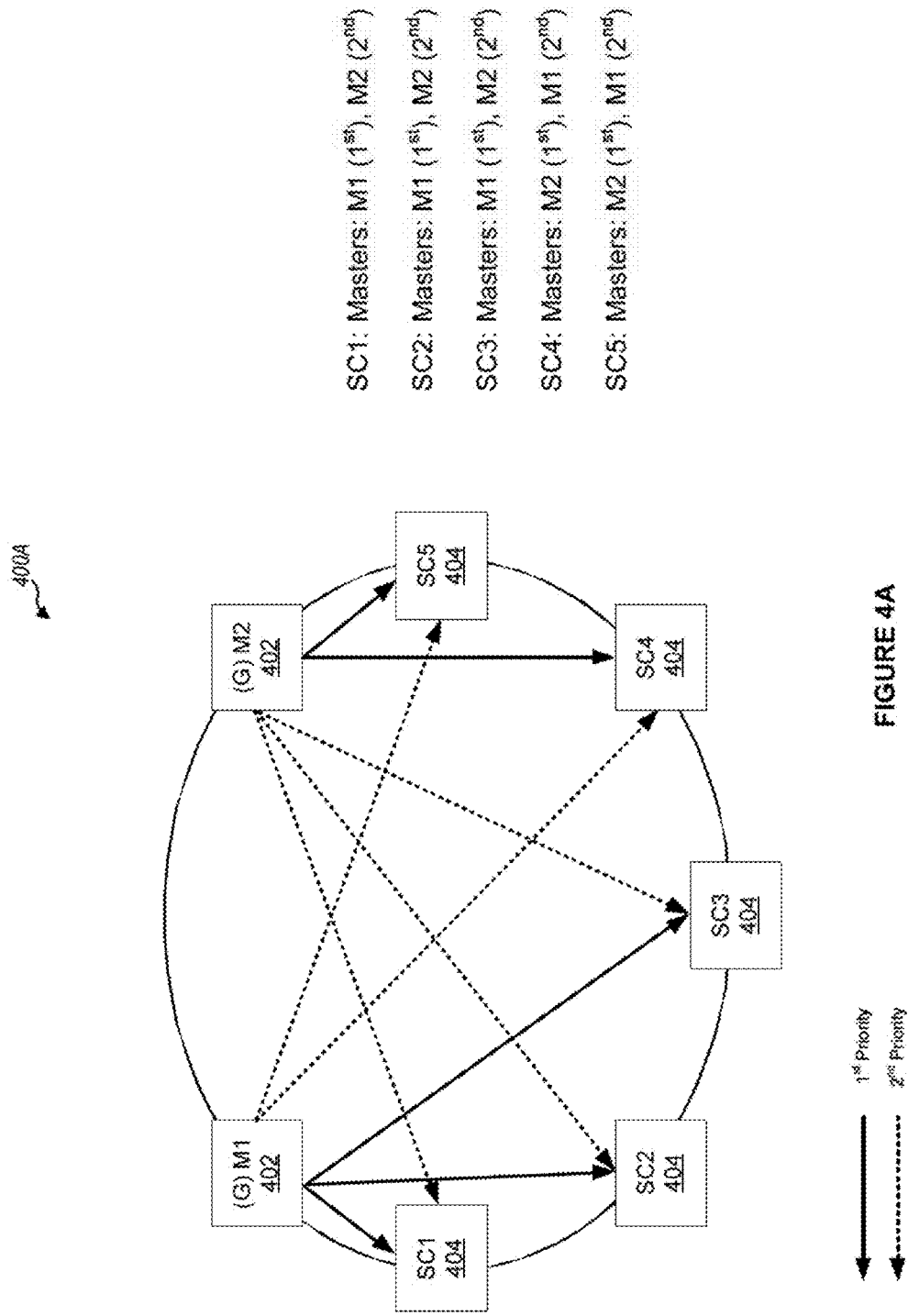
FIG. 4A illustrates an example of a ring topology of PTP nodes without on-path support in accordance with embodiments of the present disclosure.
Figure 4B:
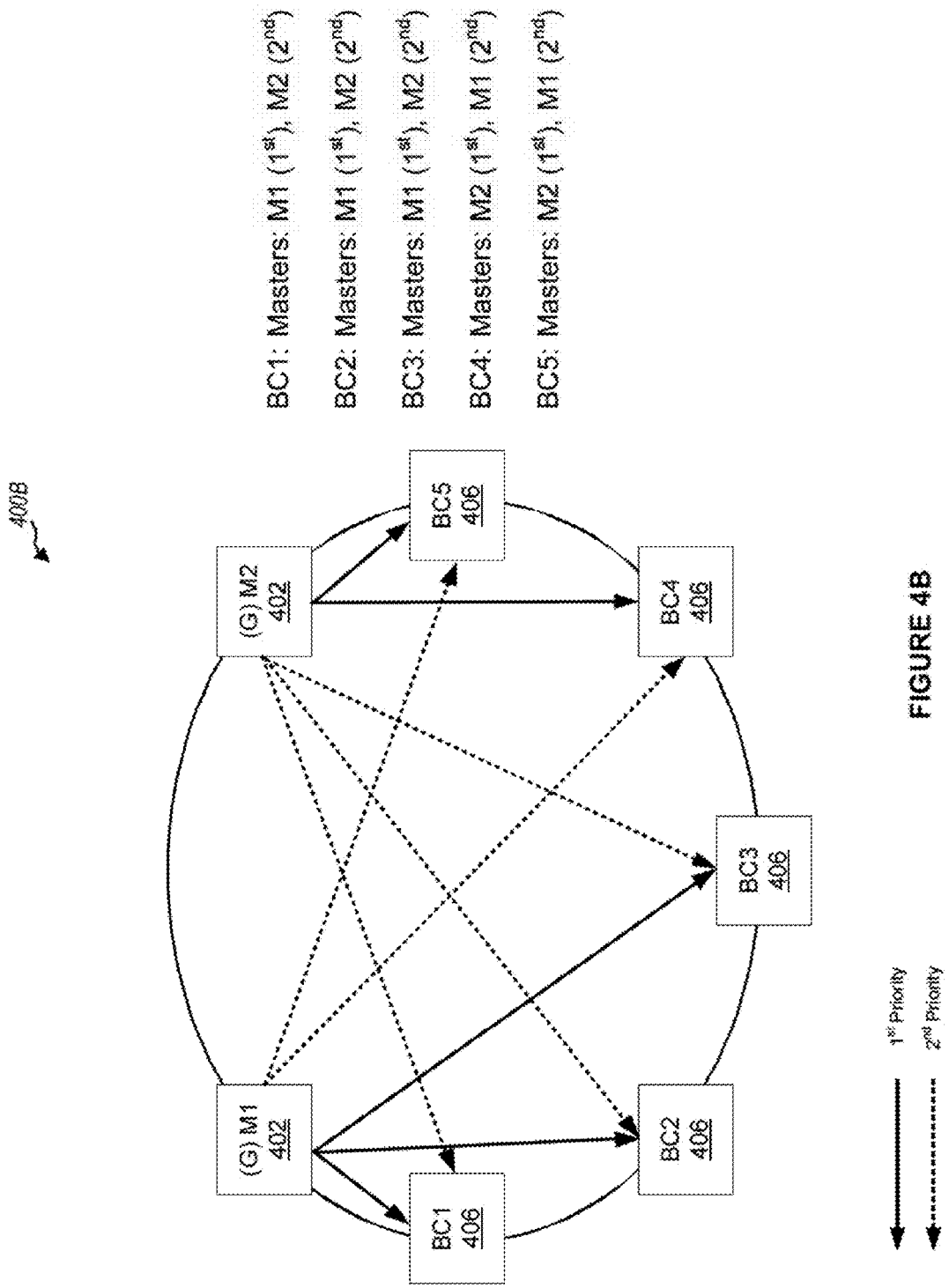
FIG. 4B illustrates an example of a ring topology of PTP node with on-path support in accordance with embodiments of the present disclosure.

FIGS. 4A and 4B, for example, illustrate, respectively, PTP nodes deployed in a network topology 400A without "on-path support" and in a network topology 400B with "on-path support."

A PTP deployment scenario that uses all BCs and/or TC(s) for the intermediate nodes within a network may, in general, refer to a PTP deployment with "on-path support" or a "fully aware" PTP network topology. In contrast, a PTP deployment scenario that uses a partial number of BCs and/or TC(s) or only ordinary clocks (e.g., such as masters or slaves) may, in general, refer to a PTP deployment with "partial on-path support" or a deployment scenario with "non on-path support." As will be described in more detail below, the use of a PTP "on-path support" deployment or PTP "non on-path support" deployment may affect the implementation of PTP over IP (e.g., in a network topology) with redundancy.

As shown in FIG. 4A, the network topology of PTP nodes may include a ring of PTP slave clocks (SCs) (or nodes) 404 (e.g., SC1-SC5) and two master (grandmaster) nodes 402 (e.g., M1 and M2). SC1-SC3 may use M1 as a $1^{st}$ priority (P1) master and M2 as a $2^{nd}$ priority (P2) master. SC4-SC5 may use M2 as a P1 master and M1 as a P2 master. Since the network topology 400A includes ordinary slave clocks 404 as the intermediate nodes, the network topology 400A may be a network topology deployed without "on-path support."

As shown in FIG. 4B, the network topology 400B of PTP nodes may include a ring of PTP BCs (or nodes) 406 (e.g., BC1-BC5), where each BC 406 may provide timing synchronization to a number of PTP slave clocks connected to each BC node. The network topology 400B may also include at least two PTP master (or grandmaster) clocks 402 (e.g., M1 and M2), which may be traceable to a PRC clock. As compared to network topology 400A, the network topology 400B may be a "fully-aware" network topology or a network topology deployed with "on-path support" since every intermediate node includes a BC node 406.

Although network topologies 400A and 400B are shown as ring topologies, in other embodiments, the PTP nodes may be deployed in non-ring network topologies. In one embodiment, for example, a number of PTP nodes (e.g., BCs) may be configured in a linear topology with a master (grandmaster) clock at each end.

In some cases, deployments of PTP (as described in IEEE-1588v2) for mobile backhaul may require the network elements (e.g., in the network topologies 400A-400B) to provide synchronization and phase accuracy over the IP/MPLS network along with redundancy. According to an embodiment, creating a ring topology of PTP nodes may provide a redundant network path in the event there is a problem in one of the links between the PTP nodes in the ring topology. However, there may be several challenges with implementing PTP over IP in a network topology (e.g., such as a ring topology) with clock redundancy.

For example, with reference to network topology 400A, if each PTP node were to use M1 or M2 as master, then PTP traffic would be forwarded through intermediate PTP slave nodes. However, as mentioned above, in general, the routing of PTP packets in a IP/MPLS network may be subject to PDV and/or asymmetry, which may affect the accuracy that can be achieved through synchronization via PTP. Thus, since the intermediate PTP slave nodes may not correct the timestamps, the PTP slave nodes may introduce variable delay and/or asymmetry for PTP. Further, in some cases, (e.g., in PTP over IP scenarios), the PTP slave may be able to use alternate path(s) (e.g., in a ring topology) to reach the same master in the case of failure, which may also cause PDV and/or asymmetry.

Referring to network topology 400B, in some embodiments, a "fully PTP aware" network topology of "PTP aware" nodes (e.g., such as PTP BCs 406) may be used to provide clock redundancy. As mentioned above, the use of PTP BCs 406 may mitigate the effects of PDV. Thus, in this embodiment, if some node or link were to fail, a network of PTP aware nodes may be able to provide clock redundancy with limited effects of PDV. However, a "fully PTP aware" network topology may still be subject to asymmetry introduced between the different links. In addition, a "fully PTP aware" network topology may not be easy to implement in a unicast PTP over IP solution, since the role(s) of each node is generally fixed. For example, if the nodes were configured in a ring topology and if a failure in communication were to occur between two of the nodes, it may not be possible for the PTP clock path to reverse automatically without causing timing loops in the ring.

Techniques are provided herein, according to several embodiments, which may help to address the above issues with implementing PTP over IP in a network topology with clock redundancy. For clarity, certain aspects of the techniques are described herein for PTP nodes configured in ring topologies, and ring topology terminology is used in much of the description herein. However, as mentioned above, it should be noted that the techniques described herein may also be used for PTP nodes configured in non-ring topologies.

Figure 5:
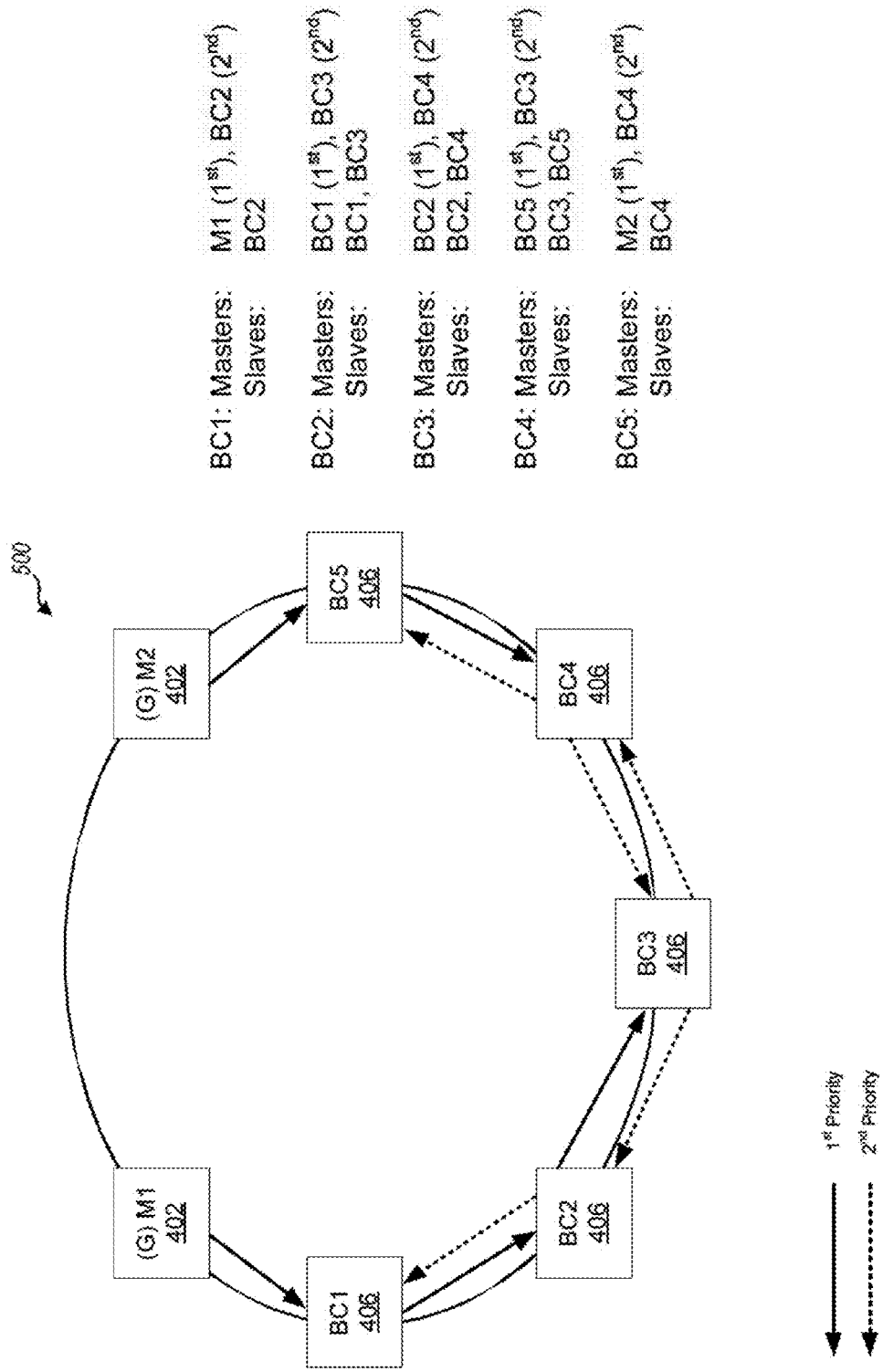
FIG. 5 illustrates an example of a ring topology of PTP nodes that may implement PTP over IP with clock redundancy in accordance with an embodiment of the present disclosure.

FIG. 5 illustrates an example ring topology 500 of PTP nodes that may implement PTP over IP with clock redundancy, according to one embodiment of the present disclosure.

In one embodiment, the ring topology 500 may be implemented as a hop-by-hop PTP aware network. For example, as shown in this particular embodiment, the ring topology may include two master (grandmaster) clocks 402 (e.g., M1 and M2) and five BCs 406 (e.g., BC1-BC5). M1 and M2 may be PTP master clocks that are traceable to a grandmaster clock. As also shown, each node BC1-BC5 may serve as a PTP master clock to its neighbor node(s). In other words, each node in the ring may be traceable to the grandmaster through a higher priority configured master and may be able to also serve as a master for its neighbor node(s).

In this particular embodiment, BC1 may have a P1 master M1, a P2 master BC2, and a slave BC2. BC2 may have a P1 master BC1, a P2 master BC3, and slaves BC1 and BC3. BC3 may have a P1 master BC2, a P2 master BC4, and slaves BC2 and BC4. BC4 may have a P1 master BC5, a P2 master BC3, and slaves BC3 and BC5. BC5 may have a P1 master M2, a P2 master BC4 and a slave BC4.

The above configuration of PTP nodes in ring topology 500 may create a redundant ring of PTP BCs 406 such that any of the clocks may be recovered from the grandmaster clock through clock-wise or counter-clockwise rings. Although, in this example embodiment, the ring topology may initially be configured to have a counter-clockwise direction (e.g., from GM1-BC3) and a clock-wise direction (e.g., from GM2 to BC4), those of ordinary skill in the art will appreciate that the ring topology, in general, may also be configured in other similar manners.

As mentioned above, each of the BC nodes 406 acting as master to a slave (e.g., another BC node 406) may exchange, as part of a PTP session between the master and slave, PTP messages containing timestamps with its slave that the slave uses to perform synchronization. However, before the PTP session is established, a unicast negotiation process may first take place between the nodes in order to determine a number of parameters related to transmission of the synchronization messages (e.g., sync, sync follow-up, delay-request, delay-response, announce, etc.) associated with the PTP session. As part of the unicast negotiation process, a PTP slave and PTP master may exchange various signaling messages (e.g., announce-request, announce-grant, sync-request, sync-grant, etc.) that may allow for a PTP session to be established between the PTP slave and master. Thus, in general, the unicast negotiation process may be used by the PTP slave in order to receive announce and sync messages from the PTP master.

The messages exchanged (as part of the PTP session) between the BC nodes 406 may be used by the BC nodes 406 to (initially and/or adaptively) determine which node(s) should be configured as master node(s) and slave node(s).

For example, in one embodiment, each of the BC nodes 406, in general, may make this determination based upon a best master clock algorithm (BMCA). In one example, the BMCA may include an alternate BMCA. In general, the BMCA may contain various criteria (e.g., rules) listed in order of priority that each of the BC nodes 406 may consider when determining whether they should become a slave or a master. For example, in one embodiment, these criteria may include, in order of preference, a priority 1 field, clock Class, clock Accuracy, clock Variance, priority 2 field, clock-identifier (ID), etc. However, in general, one of ordinary skill in the art will appreciate that other orders of preferences and/or other criteria may be considered. The BMCA may be performed in accordance with standards as defined in International Telecommunications Union-Telecommunications Standardized Sector (ITU-T) g.8265.1, g.8275.1, g.8275.2, etc.

In general, for conventional BMCAs, the slave may complete signaling negotiation with all masters but bring up the PTP session with only the selected master. However, in some cases (e.g., when the selected master goes down), this may cause a delay in switching to an alternate master.

Accordingly, techniques presented herein may also provide for a hot standby feature for a BCMA. In one embodiment, the hot standby feature may be implemented by each of the PTP nodes in ring topology 500, which may allow for a faster recovery of the PTP session, by each of the PTP nodes, in case of a failure to reach the selected master.

For example, according to this embodiment, a PTP slave (BC1 in ring topology 500, as an example) may be able to bring up a complete PTP session with all configured masters (e.g., M1 and BC2) (assuming that all masters are traceable to the same grandmaster clock). This feature may allow the PTP slave to receive timestamps from the selected master as well as alternate configured masters simultaneously, which may allow for faster switching and/or recovery when the selected master fails.

As mentioned above, one of the challenges with implementing PTP over IP (e.g., IPv4, IPv6, etc.) in a ring topology may be the presence of timing loops. As used herein, a timing loop may generally refer to a situation in which a first PTP node, upon the occurrence of one or more conditions that affect communication with a master or grandmaster node (e.g., a failure in communication with the grandmaster node), synchronizes its clock to a second PTP node that serves as a slave to the first PTP node. In some cases, (e.g., in the ring topology 500), timing loops may be created between the intermediate BCs 406 (e.g., BC1-BC5), which may cause the entire clocking network to become misaligned from the grandmaster.

Accordingly, techniques presented herein may also provide for timing loop detection and/or recovery from timing loops in a PTP ring topology.

Figure 6:
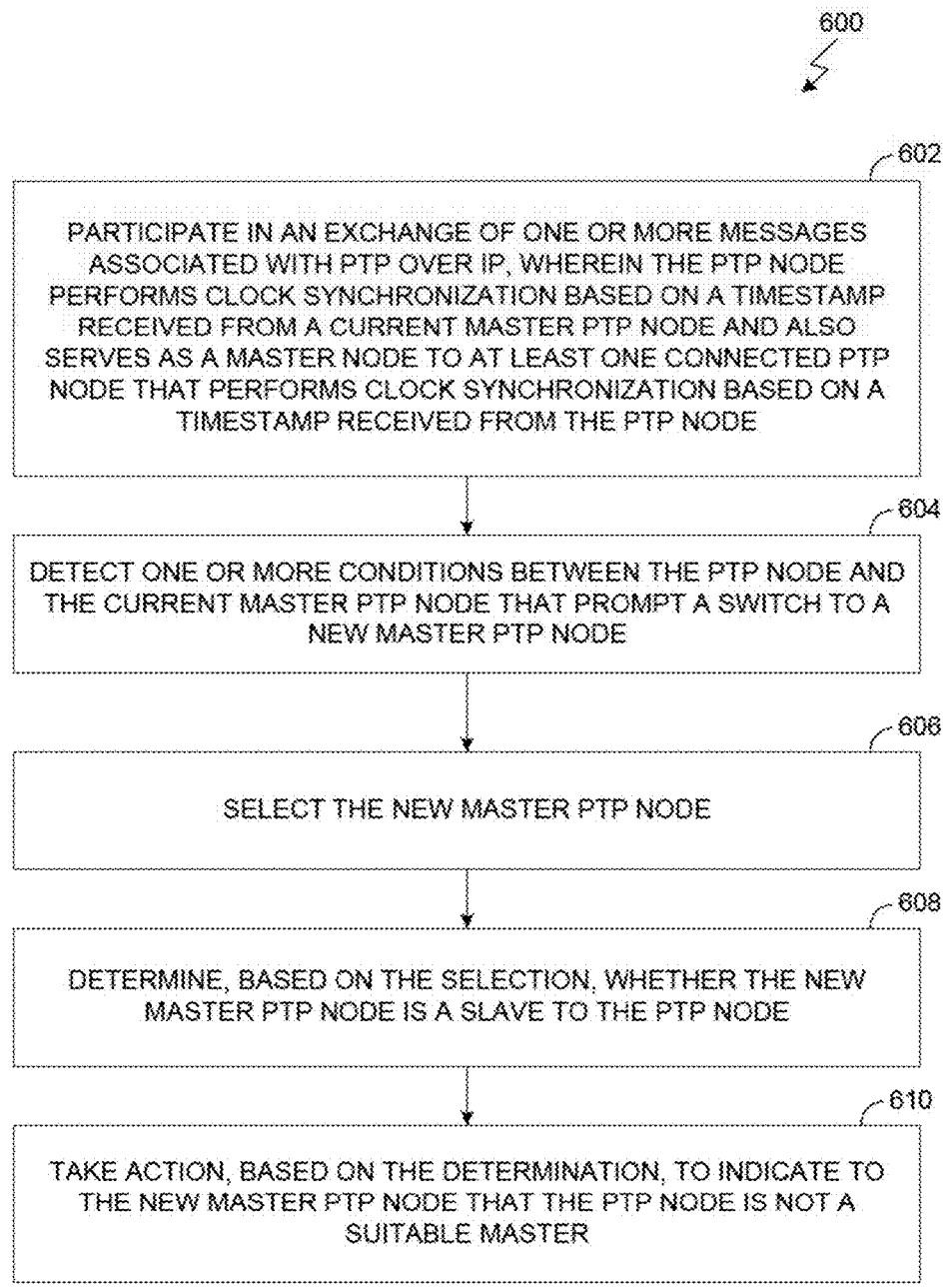
FIG. 6 is a flow diagram of example operations in accordance with embodiments of the present disclosure.

FIG. 6 is a flow diagram of example operations 600 that (as will be described in more detail below) may be used to maintain clock synchronization in the PTP ring topology (e.g., illustrated in FIG. 5). The operations 600 may be performed by a PTP node (e.g., such as BCs 1-5, etc.).

The operations 600 begin, at 602, where the PTP node may participate in an exchange of one or more messages associated with a PTP over a packet transport (e.g., IPv4, IPv6, MPLS, etc.) with a current master PTP node and at least one connected PTP node. The PTP node may perform clock synchronization based on a timestamp received from the current master PTP node and also serve as a master node to at least one connected PTP node that performs clock synchronization based on a timestamp received from the PTP node.

In one embodiment, the PTP node may include a BC node 406 (e.g., BC1 in FIG. 5), the current PTP master node may include a grandmaster node 402 (e.g., GM1 in FIG. 5), and the at least one connected PTP node may include another BC node 406 (e.g., BC2 in FIG. 5). In another embodiment, the PTP node may include a BC node 406 (e.g., BC2 in FIG. 5), the current PTP master node may include another BC node 406 (e.g., BC1 in FIG. 5), and the at least one connected PTP node may include another BC node 406 (e.g., BC3 in FIG. 5). In general, however, those of ordinary skill in the art will understand that the PTP node, current PTP master node, and at least one connected PTP node may be any of the nodes in FIG. 5.

According to an embodiment, the exchange of the one or more messages associated with PTP over IP may include PTP packets containing the one or more timestamps that may be used for synchronization.

According to an embodiment, the exchange of the one or more messages associated with PTP over IP may include announce messages transmitted by a master to a slave. The announce messages, in general, may include one or more parameters (e.g., such as, a priority 1 field, a clock-class identifier, etc.) that may be used (according to an alternate BMCA) by the PTP nodes. For example, in one implementation, the PTP node may receive announce messages from the current master PTP node and the at least one connected PTP node may receive announce messages from the PTP node.

According to yet another embodiment, the exchange of the one or more messages associated with PTP over IP may include any combination of the above messages and/or other messages described herein.

At 604, the PTP node may detect one or more conditions between the PTP node and the current master node that prompt a switch to a new master PTP node. In some examples, the one or more conditions that may prompt a switch to a new master PTP node may include a failure in communications between the PTP node and the current master node (e.g., a link failure, not receiving a minimum number of packets), a path loss between the PTP node and the current master node being above a threshold, a packet taking a longer route to reach its destination (e.g., the number of hops that a packet is routed being above a threshold), and the like. In one embodiment, the switch may be based on an alternate BMCA.

At 606, the PTP node may select the new master PTP node. According to certain aspects, the new master PTP node may be selected, if available, according to an alternate BMCA. For example, the PTP node (in accordance with the particular alternate BMCA as defined in relevant standards, such as ITU g.8265.1, g.8275.1, etc.) may compare (for each port) a data set maintained at the PTP node with that of the new master PTP node and current master node to determine if the new master PTP node should be selected.

At 608, the PTP node may determine, based on the selection, whether the new master PTP node is a slave to the PTP node. At 610, the PTP node may take action, based on the determination, to indicate to the new master PTP node that the PTP node is not a suitable master.

Figure 7A:
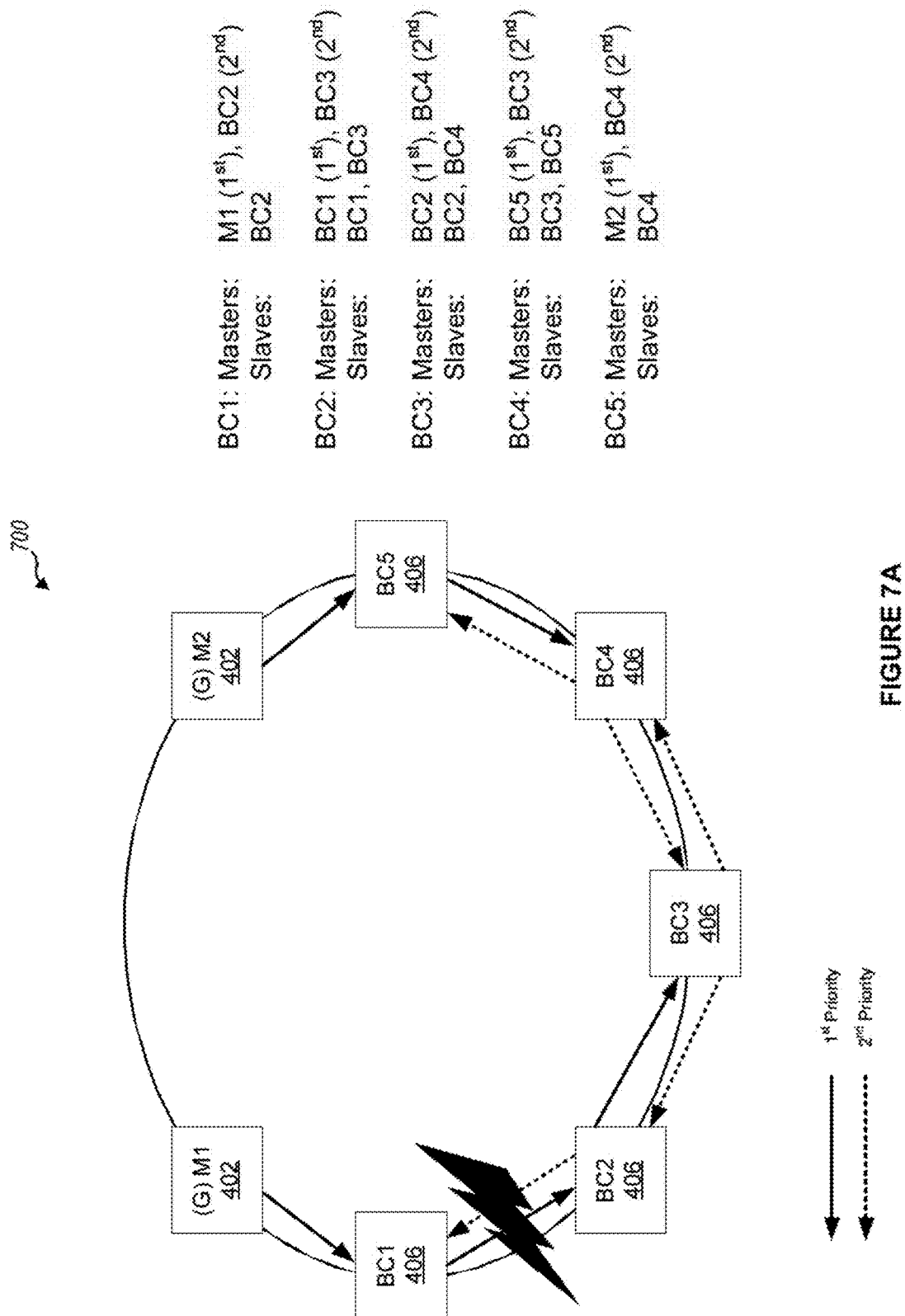
FIGS. 7A-7B illustrate an example role reversal of PTP nodes in a ring topology upon detection of a timing loop in accordance with embodiments of the present disclosure.

As mentioned above, the PTP node may determine one or more conditions that prompt a switch to a new master PTP node. As shown in FIG. 7A, for example, in one embodiment, the one or more conditions may include a failure in communications between BC1 and BC2 that prevent BC2 from synchronizing to timestamps transmitted from BC1. As mentioned above, however, in some cases, after detecting the one or more conditions that prompt a switch, if BC2 switches to its alternate master BC3, a timing loop may occur between BC2 and BC3. This timing loop may adversely affect the accuracy of the timing synchronization within the ring.

Figure 8:
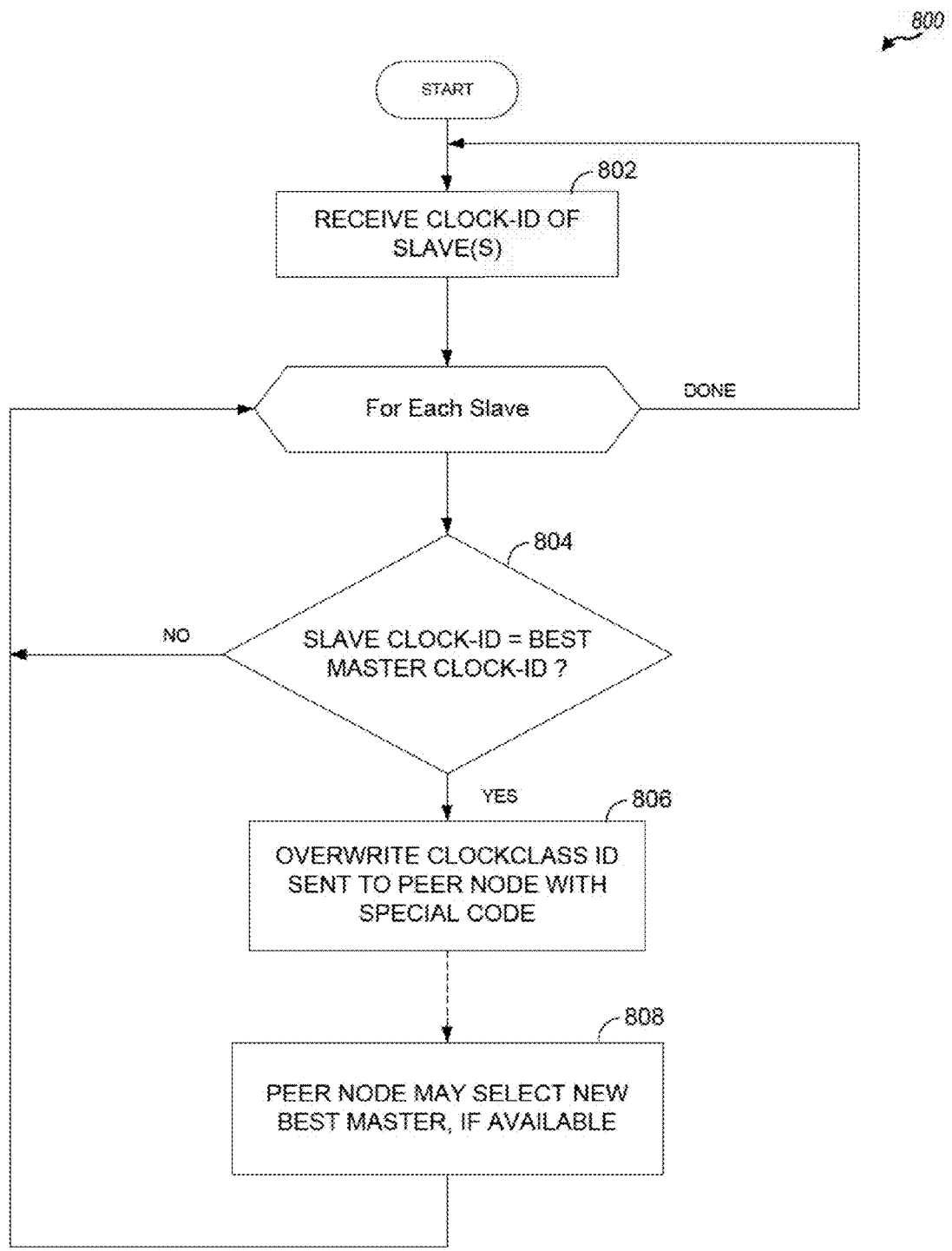
FIG. 8 is an algorithm for detecting and/or breaking timing loops in accordance with embodiments of the present disclosure.

FIG. 8 illustrates an example algorithm 800, according to one embodiment of the present disclosure, that may be used to detect and break timing loops in a ring topology (e.g., ring topology 700 in FIG. 7A).

In one embodiment, in order to detect timing loops, as mentioned above with respect to FIG. 6, the PTP node may determine, based on selection of a new master PTP node, whether the new master PTP node is a slave to the PTP node. For example, as shown in FIG. 8, the algorithm may include, at step 802, a PTP node saving (via its master port) the clock-Id of its PTP slave(s) received from the signaling messages. At step 804, the PTP node may check (via its slave port) if the selected new master PTP node (according to the alternate BMCA) is one of its slaves. In general, this may be done by comparing the clock-Id of the selected new master PTP node with all slaves connected to this particular PTP node. If the PTP node detects that the clock-ID of the selected new master PTP node is the same for any one of its slaves, then the detection may indicate the presence of a timing loop.

As also mentioned above with respect to FIG. 6, the PTP node may take action, based on the determination (of a timing loop) to indicate to the new master PTP node that the PTP node is not a suitable master. In one embodiment, taking action may include transmitting a packet having a clock-Class identifier with a special code designed to cause rejection of the PTP node as a master node. For example, as shown in FIG. 8, at step 806, the master port of the PTP node may overwrite the clock-class ID being sent to its identified peer in the timing loop with the special code to cause itself to be rejected as best master by the slave port of its identified peer. In some cases, the special code selected may have a value of 254. In other cases, the special code selected may have a value of 255. In general, however, the special code may have any value that is designed to cause a node to be rejected as best master. In one embodiment, the packet having the clock-class ID may include an announce packet. In another embodiment, the packet having the clock-class ID may include other types of packets, e.g., as part of the PTP packets containing timestamps, grant messages, etc. At step 808, the identified peer node may then select a new best master, if available (e.g., according to an alternate BMCA).

Figure 7B:
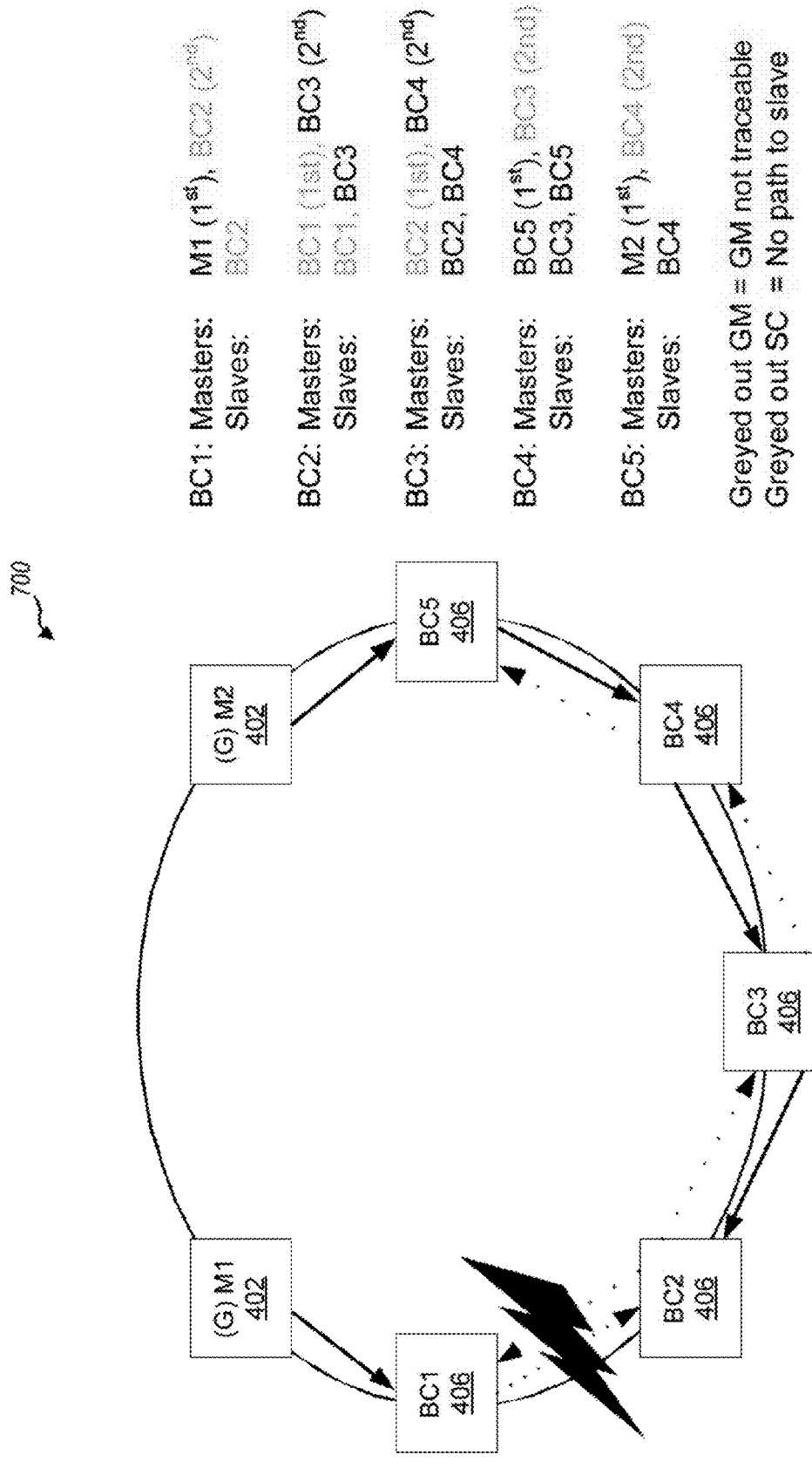

In this manner, the peer node may therefore break away from the timing loop and reverse the clock direction in the ring. As shown in FIG. 7B, for example, if BC2 attempts to select BC3 (e.g., after detecting a failure between BC1 and BC2), BC2 may not be able to select BC3 because BC3 may be sending a clock-class ID to indicate that BC2 should not use BC3 as a selected best master. As a result, BC3 may temporarily move into a holdover state.

Once in a holdover state, BC3 may stop getting timestamps from BC2 and thus, may select (as shown in FIG. 7B) BC4 as an alternate best master according to the alternate BMCA. As shown in this embodiment, since BC4 may be able to synchronize to the root timing source (e.g., GM2), BC3 may then be able to synchronize to timestamps received from BC4. Once BC3 successfully selects BC4, BC2 may be able to select BC3 upon receiving a packet from BC3 that allows BC3 to be selected as compared to one or more criteria under the alternate BMCA.

Figure 9:
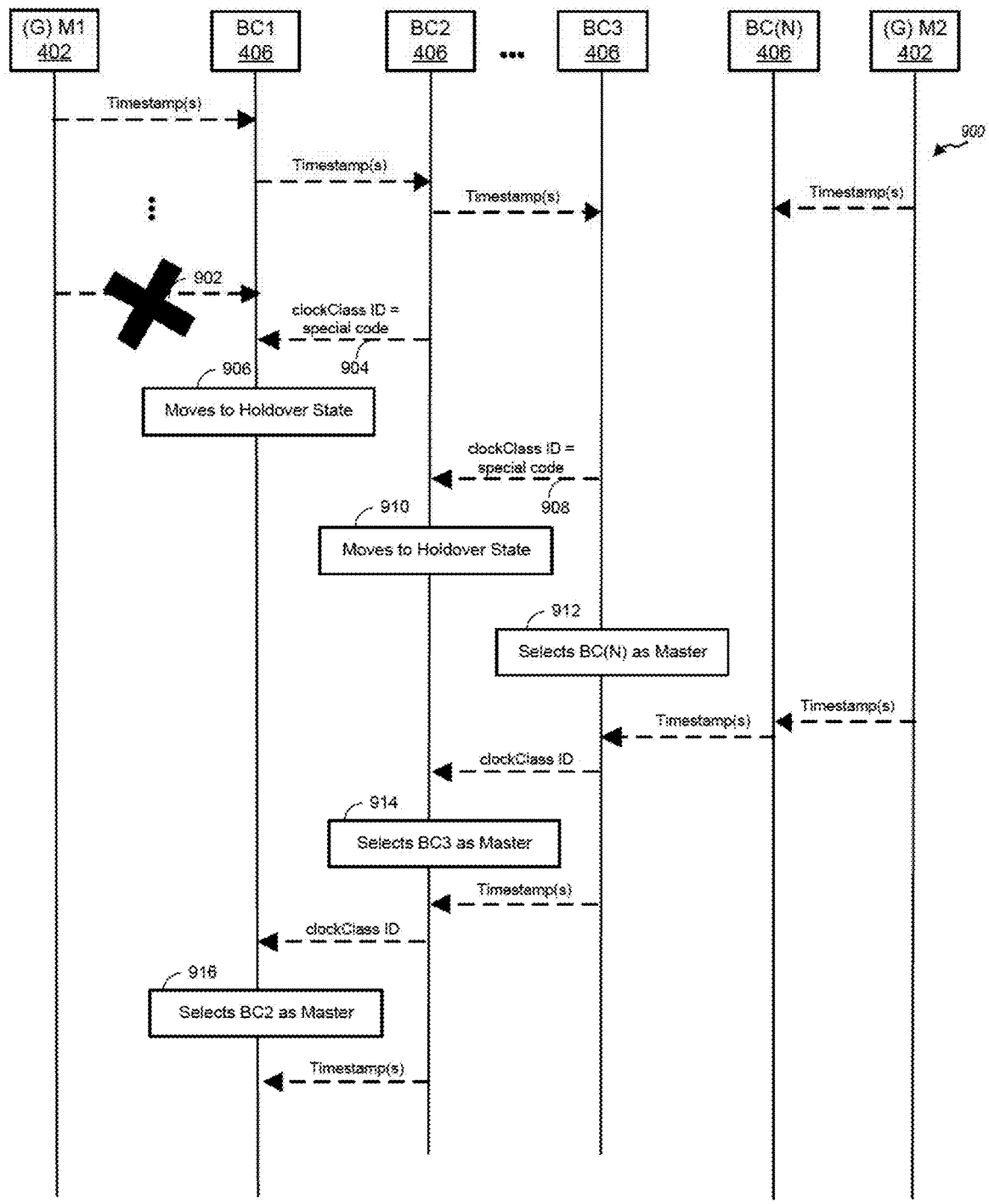
FIG. 9 is an example call flow for reversing the timing synchronization flow in a ring topology of PTP nodes in accordance with embodiments of the present disclosure.

FIG. 9 illustrates an example call flow 900 of how timing synchronization may reverse in a ring topology of PTP nodes, in accordance with another embodiment of the present disclosure. The PTP nodes (e.g., M1, BC1-BC(N), M2) illustrated in FIG. 9 may be any of the PTP nodes illustrated, for example, in FIGS. 5 and 7A-7B.

In this embodiment, the timing synchronization in ring topology of PTP nodes may initially have a clockwise direction (e.g., from M1 to BC3) and a counter-clockwise direction (e.g., from M2 to BC(N)). For example, BC1 may have initially selected M1 as its master (according to the alternate BMCA); BC2 may have initially selected BC1 as its master (according to the alternate BMCA), and so forth. Thus, in this embodiment, as shown, BC1 may receive timestamps from M1 that BC1 may use to perform synchronization; BC2 may receive timestamps from BC1 that BC2 may use to perform synchronization, and so forth.

In some cases, as mentioned above, a PTP node (e.g., BC1) may detect one or more conditions that prompt a switch to a new master PTP node. For example, as shown in FIG. 9, in one embodiment, the condition may include a failure in communications (at 902) between M1 and BC1 (e.g., a link may fail between M1 and BC1). However, as noted above, in other embodiments, the conditions that prompt a switch may also include other criteria, such as path loss, amount of received packets, number of routing hops, and the like.

Upon detecting a failure (at 902), as mentioned above, BC1 may attempt to select a new master PTP node, if available, according to an alternate BMCA. In one embodiment, for example, upon detecting a failure, BC1 may attempt to select BC2. However, in some cases, BC1 may not be able to select BC2 because BC2 (at 904) may be sending a clock-class ID (e.g., 254, 255, etc.) to indicate that BC1 should not use BC2 as a selected PTP best master. As a result, BC1 may temporarily move into a holdover state (at 906).

Once BC1 is in a holdover state, BC2 may detect that BC1 has moved into a holdover state and thus, may attempt to select BC3 as a selected best master (according to an alternate BMCA). According to an embodiment, BC2 may attempt to select BC3 after receiving a packet lesser (e.g., a packet with a holdover clock-class ID) than that which allows BC2's current master PTP node (e.g., BC1) to be selected as compared to one or more criteria under an alternate BMCA. However, in some cases, as shown, BC2 may also not be able to select BC3 because BC3 (at 908) may be sending a clock-class ID to indicate that BC2 should not use BC3 as a selected PTP best master. As a result, BC2 may temporarily move into a holdover state (at 910). In general, the above process may continue until BC3, as shown at 912, is able to select BC(N) as a selected best master according to an alternate BMCA.

Once BC(N) is selected as best master, BC3 may synchronize to timestamps received from BC(N), and may transmit a clockClass identifier to BC2 that, under the alternate BMCA, may allow BC2 to select BC3 (at 914) as a best master. Similarly, once BC3 is selected as best master by BC2, BC2 may synchronize to timestamps received from BC3 and may transmit a clockClass identifier to BC1 that, under the alternate BMCA, may allow BC1 to select BC2 (at 916) as a best master and synchronize to timestamps received from BC2.

Accordingly, by transmitting a clockClass identifier to a best master in a potential timing loop situation, the PTP nodes in a ring topology may be able to reverse roles quickly to converge towards an alternative clock source (e.g., such as M2). For example, if the timing synchronization in the ring topology was initially configured in a clockwise direction, after the reversal of the roles of the PTP nodes in the ring topology, the timing synchronization in the ring topology will be in a counter-clockwise direction (e.g., right to left).

According to certain embodiments, techniques presented herein may also provide for a hop-by-hop PTP implementation for a ring topology of PTP nodes (e.g., ring topology 500).

For a ring topology of BCs 406, it may be desirable for PTP traffic to not be routed across alternate paths in the ring (e.g., in order to protect the hop-by-hop design). For example, in the case of a link or node failure, the PTP master may become reachable through longer alternate path(s) which may break the hop-by-hop PTP design. Referring back to FIG. 5, for example, if the link between M1 and BC1 were to fail and/or BC1 were to determine that communication between M1 and BC1 was not suitable (e.g., due to path loss, loss of packets, etc.), in some cases, BC1 may still be able to reach M1 through the other PTP nodes. For example, in this scenario, BC1 may be able to reach M1 by transmitting a packet to BC2 that is eventually routed (through BC3, BC4, BC5) to M2, which is directly connected to M1. This longer alternate path, however, may not be suitable for a hop-by-hop PTP design.

To address this, in one embodiment, techniques presented herein may allow for setting a time to live (TTL) value to indicate an allowable number of routing hops. For example, according to this embodiment, each of the PTP nodes, when transmitting PTP packets, may set a TTL value in a transport header carrying a PTP in order to indicate a number of allowable routing hops of one or more PTP packets. In one case, in order to allow for only single hop-by-hop transmission, the TTL value may be set to 1 to indicate that the routing of the PTP packet is limited to a single hop. In other cases, the TTL value may be set to higher values to indicate that more hops are allowed. According to this embodiment, the transport carrying the PTP header may be in accordance with any transport protocol used for transmitting information in a network, such as transmission control protocol (TCP)/IP, user datagram protocol (UDP), and the like. According to an embodiment, the one or more PTP packets may be included within the one or more messages (mentioned above with respect to FIG. 6) exchanged between the PTP nodes.

Setting the TTL value to indicate an allowable number of hops may help to control the routing of PTP traffic through intermediate routers. This may also allow the PTP to work at link-level only, reducing forwarding behavior that may otherwise cause packet delay variation (PDV) and/or asymmetry variation.

Additionally or alternatively, in another embodiment, techniques presented herein may allow for designating an access control list (ACL) within PTP nodes to provide for a hop-by-hop PTP design. For example, in this embodiment, an ACL may be defined to specify that any packet taking a longer route (e.g., as opposed to a single hop route) should be dropped. Using the example described above, if BC1 were to determine that the link between M1 and BC1 was not suitable for communication, and still try to reach M1 through M2, M2 (or any other PTP node between M1 and M2) would be able to drop the packet (in accordance with the access control list), and therefore protect the hop-by-hop PTP design.

In general, the techniques presented herein may provide PTP over IP redundancy on a hop-by-hop ring of PTP BCs operating in unicast mode. The hop-by-hop topology may provide for accurate and reliable clock recovery in the absence of any PDV introducing layer 3 devices between PTP master and slave. Further, in certain aspects, the techniques may also allow for the prevention of PTP timing loops in a ring topology of hop-by-hop BCs, which may enable faster convergence towards an alternative PTP clock in reverse direction in case of a failure.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the present disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, any of nodes within the resources located in the cloud may implement one or more synchronization protocols, such as PTP, according to the various techniques presented herein. Doing so may improve the level of timing synchronization that may be achieved from a network connected to the cloud (e.g., the Internet).

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method for maintaining clock synchronization by a precision time protocol (PTP) node, comprising:
    participating in an exchange of one or more messages associated with a PTP over a packet transport, wherein the PTP node performs clock synchronization based on a timestamp received from a current master PTP node and also serves as a master node to at least one connected PTP node that performs clock synchronization based on a timestamp received from the PTP node;
    detecting one or more conditions between the PTP node and the current master PTP node that prompt a switch, based on an alternate best master control algorithm (BMCA), to a new master PTP node;
    selecting the new master PTP node, based on the alternate BMCA;
    determining, based on the selection, whether the new master PTP node is a slave to the PTP node; and
    taking action, based on the determination, to indicate to the new master PTP node that the PTP node is not a suitable master.

2. The method of claim 1, wherein the determining is further based on a comparison of a clock-identifier (clock-ID) of the new master PTP node and a clock-ID of the at least one connected PTP node.

3. The method of claim 1, wherein taking action comprises:

transmitting a packet having a clock-Class identifier with a special code designed to cause rejection of the PTP node as a master node.

4. The method of claim 3, further comprising, selecting the new master PTP node after receiving a packet which allows the new master PTP node to be selected as compared to one or more criteria under the alternate BMCA.

5. The method of claim 1, wherein:
the one or more messages exchanged comprise one or more PTP packets; and
the method further comprises setting a time to live (TTL) value in a transport header carrying a PTP in order to indicate a number of allowable routing hops of the PTP packets.

6. The method of claim 1, further comprising:
participating in a negotiation, with a plurality of PTP nodes configured as master PTP nodes to the PTP node, for an exchange of one or more messages between the PTP node and the plurality of PTP nodes; and
wherein the exchange of the one or more messages between the PTP node and the plurality of PTP nodes comprises simultaneously receiving one or more timestamps from the plurality of PTP nodes.

7. The method of claim 1, wherein the packet transport comprises any of internet protocol (IP) version 4 (IPv4), IPv6, and multi-protocol label switching (MPLS).

8. The method of claim 3, wherein the special code has a value of 254 or 255.

9. A network device configured to implement precision time protocol (PTP), comprising:
a processor configured to:
participate, via a plurality of ports, in an exchange of one or more messages associated with a PTP over a packet transport, wherein the processor synchronizes a local clock based on a timestamp received, via a first port of the plurality of ports, from a current master PTP network device, and transmits, via a second port of the plurality of ports, a timestamp to at least one connected PTP network device that performs clock synchronization based on the transmitted timestamp;
detect one or more conditions between the network device and the current master PTP network device that prompt a switch, based on an alternate best master control algorithm (BMCA), to a new master PTP network device;
select the new master PTP network device, based on the alternate BMCA;
determine, based on the selection, whether the new master PTP network device is a slave to the network device; and
take action, based on the determination, to indicate to the new master PTP network device that the network device is not a suitable master; and a memory coupled to the processor.

10. The network device of claim 9, wherein the processor is configured to determine whether the new master PTP network device is a slave to the network device based on a comparison of a clock-identifier (clock-ID) of the new master PTP network device and a clock-ID of the at least one connected PTP network device.

11. The network device of claim 9, wherein the processor is configured to take action by transmitting a packet having a clock-Class identifier with a special code designed to cause rejection of the network device as a master network device.

12. The network device of claim 11, wherein the processor is further configured to select the new master PTP network device after receiving, via the second port of the plurality of ports, a packet which allows the new master PTP network device to be selected as compared to one or more criteria under the alternate BMCA.

13. The network device of claim 9, wherein:
the one or more messages exchanged comprise one or more PTP packets; and the processor is further configured to set a time to live (TTL) value in a transport header carrying a PTP in order to indicate a number of allowable routing hops of the PTP packets.

14. The network device of claim 9, wherein the processor is further configured to:
participate in a negotiation, via the plurality of ports, with a plurality of PTP network devices configured as master PTP network devices to the network device, for an exchange of one or more messages between the network device and the plurality of PTP network devices; and
wherein the exchange of the one or more messages between the network device and the plurality of PTP network devices comprises simultaneously receiving, via the plurality of ports, one or more timestamps from the plurality of PTP network devices.

15. The network device of claim 9, wherein the packet transport comprises any of internet protocol (IP) version 4 (IPv4), IPv6, and multi-protocol label switching (MPLS).

16. The network device of claim 11, wherein the special code has a value of 254 or 255.

17. A non-transitory computer-readable medium containing computer program code that, when executed, performs an operation comprising:
participating, by a precision time protocol (PTP) node, in an exchange of one or more messages associated with a PTP over a packet transport, wherein the PTP node performs clock synchronization based on a timestamp received from a current master PTP node and also serves as a master node to at least one connected PTP node that performs clock synchronization based on a timestamp received from the PTP node;
detecting one or more conditions between the PTP node and the current master PTP node that prompt a switch, based on an alternate best master control algorithm (BMCA), to a new master PTP node;
selecting the new master PTP node, based on the alternate BMCA;
determining, based on the selection, whether the new master PTP node is a slave to the PTP node; and
taking action, based on the determination, to indicate to the new master PTP node that the PTP node is not a suitable master.

18. The non-transitory computer-readable medium of claim 17, wherein the determining is further based on a comparison of a clock-identifier (clock-ID) of the new master PTP node and a clock-ID of the at least one connected PTP node.

19. The non-transitory computer-readable medium of claim 17, wherein taking action comprises:
transmitting a packet having a clock-Class identifier with a special code designed to cause rejection of the PTP node as a master node.

20. The non-transitory computer-readable medium of claim 19, further comprising selecting the new master PTP node after receiving a packet which allows the new master PTP node to be selected as compared to one or more criteria under the alternate BMCA.

* * * * *